(12) United States Patent
Zhan et al.

(10) Patent No.: US 7,257,501 B2
(45) Date of Patent: Aug. 14, 2007

(54) APPARATUS AND METHOD FOR IDENTIFYING INFORMATIVE DATA IN A PROCESS CONTROL ENVIRONMENT

(75) Inventors: Charles Q. Zhan, Chandler, AZ (US); Joseph Z. Lu, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/281,849

(22) Filed: Nov. 17, 2005

(65) Prior Publication Data

US 2007/0112531 A1 May 17, 2007

(51) Int. Cl.
G06F 15/00 (2006.01)

(52) U.S. Cl. .................. 702/69; 702/182; 702/188; 700/9

(58) Field of Classification Search .................. 702/69, 702/47, 109, 182, 185, 188, 189; 700/9; 73/1.01
See application file for complete search history.

(56) References Cited

U.S. PATENT DOCUMENTS

| | | | |
|---|---|---|---|
| 5,262,958 A | 11/1993 | Chui et al. | |
| 5,381,697 A | 1/1995 | van der Pol | |
| 5,594,180 A | 1/1997 | Carpenter et al. | |
| 5,616,824 A * | 4/1997 | Abdel-Malek et al. | 73/1.01 |
| 5,641,891 A | 6/1997 | Frankl et al. | |
| 5,646,600 A | 7/1997 | Abdel-Malek et al. | |
| 5,750,879 A | 5/1998 | Ohtsuka et al. | |
| 5,966,674 A | 10/1999 | Crawford et al. | |
| 6,208,943 B1 | 3/2001 | Randolph et al. | |
| 6,408,676 B1 | 6/2002 | Stratton et al. | |
| 6,505,517 B1 | 1/2003 | Eryurek et al. | |
| 6,539,315 B1 | 3/2003 | Adams et al. | |
| 6,654,697 B1 * | 11/2003 | Eryurek et al. | 702/47 |
| 6,725,167 B2 | 4/2004 | Grumstrup et al. | |
| 2003/0019297 A1 | 1/2003 | Fiebelkorn et al. | |
| 2003/0216888 A1 | 11/2003 | Ridolfo | |
| 2004/0024568 A1 | 2/2004 | Eryurek et al. | |
| 2005/0104020 A1 | 5/2005 | Zhan et al. | |

OTHER PUBLICATIONS

Fujun He et al. "WPT-SVMs Based Approach for Fault Detection of Valves in Reciprocating Pumps", Proceedings of the American Control Conference, Anchorage, AK, May 8-10, 2002, pp. 4566-4570.

Jiang Wanlu et al., "Applying Multiresolution Analysis for Processing of Hydraulic Pump Fault Signal", pp. 1-5.

(Continued)

Primary Examiner—Eliseo Ramos-Feliciano
Assistant Examiner—Phuong Huynh
(74) Attorney, Agent, or Firm—Munck Butrus, P.C.

(57) ABSTRACT

A method includes identifying a signal and a disturbance using historical data associated with one or more process variables. The method also includes decomposing the signal and the disturbance at a plurality of resolution levels. The method further includes identifying a plurality of points associated with the decomposed signal using the decomposed signal and the decomposed disturbance. In addition, the method includes selecting at least some of the points and extracting a plurality of data segments from the signal, where the data segments are associated with the selected points.

21 Claims, 7 Drawing Sheets

OTHER PUBLICATIONS

Wang et al., "The Fault Character of the Motors Identified Based on Wavelet Transform", Nov. 2-5, 2003, Proceedings of the Second International Conference on Machine Learning and Cybernetics, Xi'an, pp. 2394-2398.

Mallat et al., "Singularity Detection and Processing with Wavelets", Mar. 1992, IEEE Transactions on Information Theory, vol. 38, No. 2, pp. 617-643.

Simon G. Braun, "The Signature Analysis of Sonic Bearing Vibrations", IEEE Transactions on Sonics and Ultrasonics, vol. SU-27, No. 6, Nov. 1980, pp. 317-328.

Y. Gao et al., "Wavelet-Based Pressure Analysis for Hydraulic Pump Health Diagnosis", Transactions of the ASAE, vol. 46(4), pp. 969-976.

Horch A, "A Simple Method for Detection of Stiction In Control Valves", Control Engineering Practice, Pergamon Press, Oxford, GB, vol. 7, 1999, pp. 1221-1231.

Parves S. et al., A Wavelet-Based Multi-Resolution PID Controller, 2003 IEEE Conference, Salt Lake City, UT, Oct. 2003, vol. 3 of 3, Conf. 38, pp. 1-5.

Zhihan Xu et al., Design of-Fault Detection and Isolation Via Wavelet Analysis and Neural Network, 2002 IEEE Symposium, Vancouver, Canada, Oct. 2002, pp. 467-472.

Song Zhihuan et al., Adaptive Predictive Control Based on Wavelet Approximation Models, IEEE Conference, Beijing China, Oct. 1996, vol. 2, pp. 820-824.

Xiaohua Xia et al., Nonlinear Adaptive Predictive Control Based on Orthogonal Wavelet Networks, Shanghai China, Jun. 2002, vol. 1, pp. 305-311.

* cited by examiner

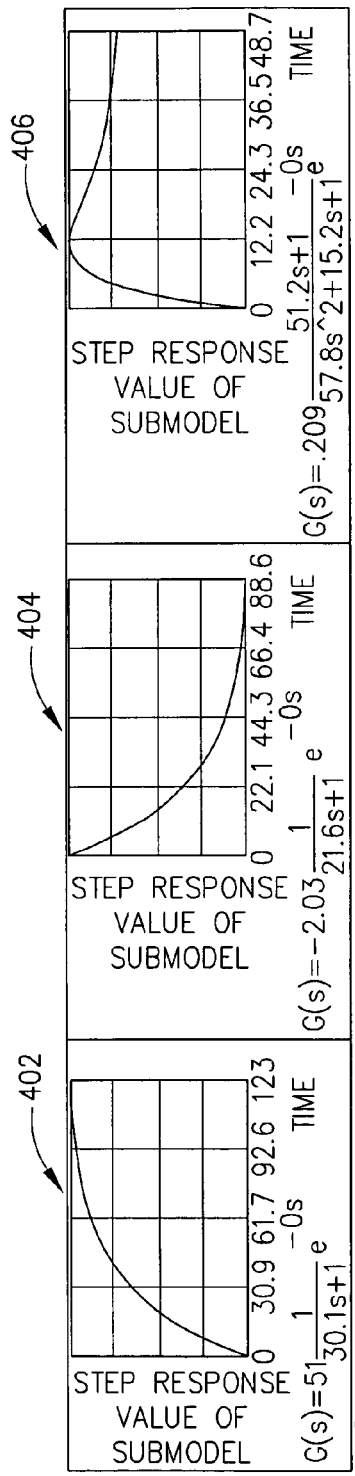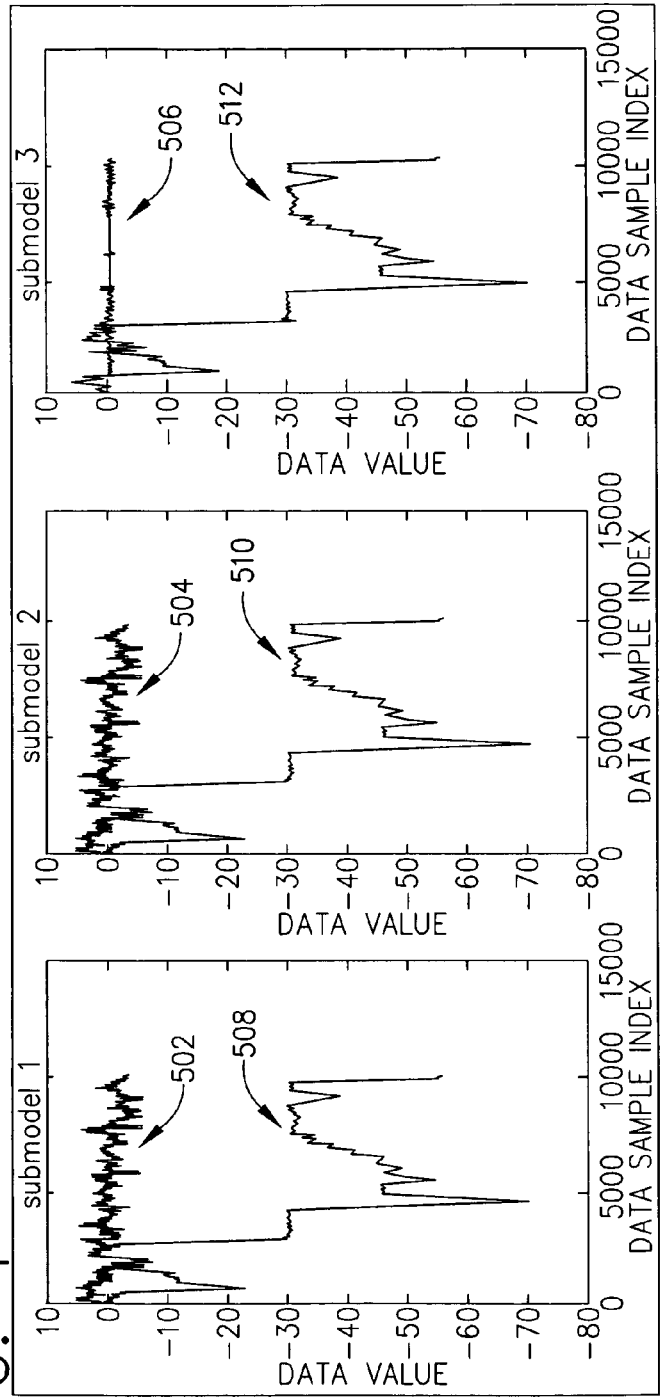
FIG. 4
FIG. 5

APPARATUS AND METHOD FOR IDENTIFYING INFORMATIVE DATA IN A PROCESS CONTROL ENVIRONMENT

CROSS REFERENCE TO RELATED APPLICATIONS

This patent application is related to U.S. patent application Ser. No. 11/281/277 entitled "APPARATUS AND METHOD FOR ANALYZING MODEL QUALITY IN A PROCESS CONTROL ENVIRONMENT" filed on Nov. 17, 2005, which is hereby incorporated by reference.

TECHNICAL FIELD

This disclosure relates generally to process control systems and more specifically to an apparatus and method for identifying informative data in a process control environment.

BACKGROUND

Processing facilities are typically managed using process control systems. Example processing facilities include manufacturing plants, chemical plants, crude oil refineries, and ore processing plants. Motors, catalytic crackers, valves, and other industrial equipment typically perform actions needed to process materials in the processing facilities. Among other functions, the process control systems often manage the use of the industrial equipment in the processing facilities.

In conventional process control systems, controllers are often used to control the operation of the industrial equipment in the processing facilities. The controllers could, for example, monitor the operation of the industrial equipment, provide control signals to the industrial equipment, and generate alarms when malfunctions are detected.

Advanced controllers often use model-based control techniques to control the operation of the industrial equipment. Model-based control techniques typically involve using models to analyze input data, where the models identify how the industrial equipment should be controlled based on the input data being received. Model-based control techniques have been widely accepted throughout the process control industry. Studies have determined that model-based control techniques can greatly improve the performance of processing facilities and provide significant economic benefits. However, the benefits provided by model-based control techniques depend heavily on the quality of the models being used. As a result, techniques have been developed to validate the models to ensure that the models have an acceptable quality.

Conventional techniques for validating a model typically involve injecting external signals into a process control system or performing open loop testing of the process control system. Both techniques typically disrupt the normal operation of the process control system, which may disturb the normal operation of the entire processing facility. Also, conventional model validation techniques typically either (i) do not analyze historical operating data associated with a controller that uses a model, or (ii) use the historical operating data to produce incorrect or misleading results. This may be due to the fact that only a small fraction of the historical operating data is usually relevant to model validation, and the operating data is often contaminated by noise or other disturbances.

SUMMARY

This disclosure provides an apparatus and method for identifying informative data in a process control environment.

In a first embodiment, a method includes identifying a signal and a disturbance using historical data associated with one or more process variables. The method also includes decomposing the signal and the disturbance at a plurality of resolution levels. The method further includes identifying a plurality of points associated with the decomposed signal using the decomposed signal and the decomposed disturbance. In addition, the method includes selecting at least some of the points and extracting a plurality of data segments from the signal, where the data segments are associated with the selected points.

In a second embodiment, an apparatus includes at least one memory capable of storing historical data associated with one or more process variables. The apparatus also includes at least one processor capable of identifying a signal and a disturbance using the historical data and decomposing the signal and the disturbance at a plurality of resolution levels. The at least one processor is also capable of identifying a plurality of points associated with the decomposed signal using the decomposed signal and the decomposed disturbance. The at least one processor is further capable of selecting at least some of the points and extracting a plurality of data segments from the signal, where the data segments are associated with the selected points.

In a third embodiment, a computer program is embodied on a computer readable medium and is operable to be executed by a processor. The computer program includes computer readable program code for identifying a signal and a disturbance using historical data associated with one or more process variables. The computer program also includes computer readable program code for decomposing the signal and the disturbance at a plurality of resolution levels. The computer program further includes identifying a plurality of points associated with the decomposed signal using the decomposed signal and the decomposed disturbance. In addition, the computer program includes computer readable program code for selecting at least some of the points and extracting a plurality of data segments from the signal, where the data segments are associated with the selected points.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 3 through 6 illustrate an example method for analyzing model quality in a process control system according to one embodiment of this disclosure.

DETAILED DESCRIPTION

Figure 1:
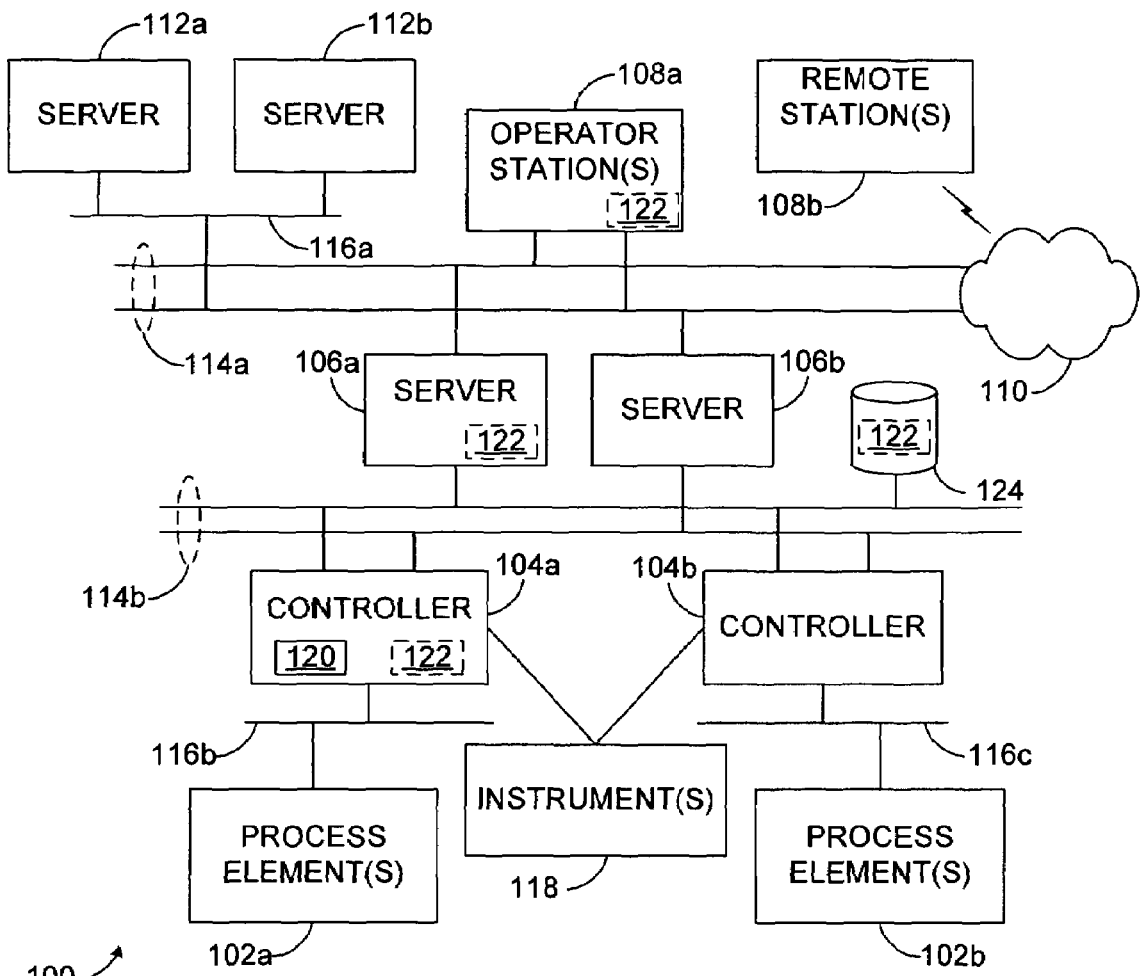
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a processing environment that perform any of a wide variety of functions. For example, the process elements 102a-102b could represent motors, valves, and other industrial equipment in a processing environment. The process elements 102a-102b could represent any other or additional components in a processing environment. Each of the process elements 102a-102b includes any hardware, software, firmware, or combination thereof for performing one or more functions in a processing environment. The process elements 102a-102b could, for example, represent any component, device, or system capable of manipulating, altering, or otherwise processing one or more materials in a processing environment.

Two controllers 104a-104b are coupled to the process elements 102a-102b. The controllers 104a-104b control the operation of the process elements 102a-102b. For example, the controllers 104a-104b could periodically provide control signals to the process elements 102a-102b. Each of the controllers 104a-104b includes any hardware, software, firmware, or combination thereof for controlling one or more process elements 102a-102b. The controllers 104a-104b could, for example, represent C300 controllers. As another example, the controllers 104a-104b could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing WINDOWS 2000 from MICROSOFT CORPORATION. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b. The operator stations 108a-108b represent computing or communication devices providing user access to the servers 106a-106b, which could then provide user access to the controllers 104a-104b and the process elements 102a-102b. For example, the operator stations 108a-108b could allow users to review the operational history of the process elements 102a-102b using information collected by the controllers 104a-104b and servers 106a-106b. The operator stations 108a-108b could also allow the users to adjust the operation of the process elements 102a-102b, controllers 104a-104b, or servers 106a-106b. Each of the operator stations 108a-108b includes any hardware, software, firmware, or combination thereof for supporting user access and control of the system 100. The operator stations 108a-108b could, for example, represent personal computers executing WINDOWS 95, WINDOWS 2000, or WINDOWS NT from MICROSOFT CORPORATION.

In this example, at least one of the operator stations 108b is a remote station. The remote station is coupled to the servers 106a-106b through a remote network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the overall operation of the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, the controllers 104a-104b control the operation of the process elements 102a-104b using information from one or more instruments 118. In general, the instruments 118 monitor or measure one or more process variables in the process control system 100. The process variables generally represent aspects of the process control system 100 that are monitored or measured in order to control the process elements 102a-102b. For example, the process elements 102a-102b could represent valves, and the instruments 118 could measure the flow rates of materials through the valves. In this example, the flow rates of materials through the valves represent the process variables monitored or measured by the instruments 118. The instruments 118 represent any suitable device or devices for monitoring or measuring one or more process variables in the process control system 100.

Each of the controllers 104a-104b also uses a model 120 to control the operation of its respective process elements 102a-102b. The following terminology may be used when discussing a model 120. A "controlled variable" represents a variable that a controller 104a or 104b attempts to maintain within a specified operating range or otherwise control using a model 120. The specified operating range may be defined by a "controlled variable lower limit" and a "controlled variable upper limit." A "manipulated variable" represents a variable manipulated by the controller 104a or 104b to control a controlled variable. As examples, a controlled variable could represent the flow rate of material through a valve, and a manipulated variable could represent the opening of the valve that controls the flow rate. A "disturbance variable" represents a variable that affects a controlled variable but that cannot be controlled by the controller 104a or 104b. As an example, a disturbance variable could represent random unpredictable and uncontrollable fluctuations that affect the flow rate of material through the valve. A "model" represents one or more mathematical functions that describe the relationship between one or more manipulated variables and one or more controlled variables. A "submodel" in a model refers to a mathematical function that describes the relationship between a specific controlled variable and a specific manipulated variable.

The model 120 in FIG. 1 describes one or more relationships between one or more manipulated variables and one or more controlled variables. For example, the model 120 may describe how the flow rate of material through a valve changes by adjusting the valve opening. In this way, the model 120 can be used to control the flow rate. The model 120 may generally be described by a mathematical function G(s), which represents the transformation of input data (such as control signals to be sent to the valve) into output data (such as the flow rate through the valve).

One or more components in the system 100 may also include historical operating data 122 associated with each of the controllers 104a-104b. The historical operating data 122 could, for example, reside in the controller itself, a server (such as server 106a), an operator station (such as station 108a), or a historian 124 or other data repository or data collection device. The historical operating data 122 represents information identifying the historical or past operations of one or more controllers. For example, the historical operating data 122 could represent samples of the input data received by the controller 104a or 104b and samples of the output data produced by the controller 104a or 104b. As a particular example, the historical operating data 122 could represent samples of the input and output data, where the samples are taken every minute for a given time period (such as a week).

To ensure that the models 120 used by the controllers 104a-104b have an acceptable quality, the models 120 are typically validated one or more times. This helps to ensure that the models 120 are valid and can be used to effectively control the process elements 102a-102b.

In accordance with this disclosure, a model 120 used by a controller is validated using the historical operating data 122 for that controller. Informative or useful data from the historical operating data 122 is identified, which helps to reduce the noise or other disturbances contained in the historical data.

The informative data is then extracted and analyzed at multiple resolution levels to determine the predictability of the model 120. The predictability of the model 120 provides an indication as to the validity or quality of the model 120. Analyzing the informative data at multiple resolution levels allows transients with different dynamic behaviors to be captured. The transients typically represent portions of the historical operating data 122 that are more relevant to the validation of the model 120. Moreover, different weights may be associated with different resolution levels. In this way, certain frequencies within the informative data may be given more or less importance during the analysis. Additional details of how a model 120 is validated are shown in FIGS. 3 through 6, which are described below. Additional details of how informative data is identified and extracted are shown in FIGS. 7 through 13, which are also described below.

Although FIG. 1 illustrates one example of a process control system 100, various changes may be made to FIG. 1. For example, a control system could include any number of process elements, controllers, servers, and operator stations. Also, FIG. 1 illustrates one operational environment in which the model validation and informative data identification techniques described above could be used. The model validation technique and/or the informative data identification technique could be used in any other suitable device or system.

Figure 2:
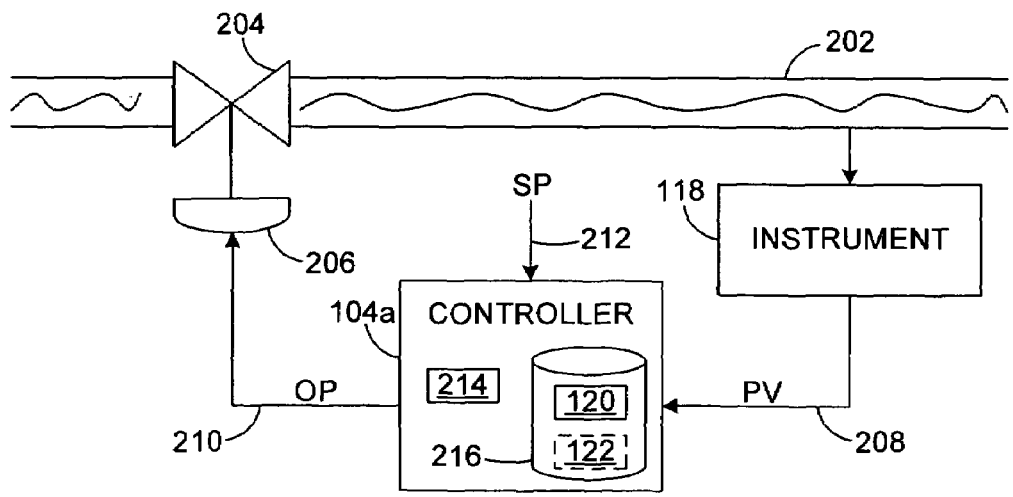
FIG. 2 illustrates additional details of an example process control system according to one embodiment of this disclosure.

FIG. 2 illustrates additional details of an example process control system according to one embodiment of this disclosure. In particular, FIG. 2 illustrates a portion of the process control system 100, where the process control system 100 is used to monitor and control the operation of a valve. The specific embodiment of the process control system 100 shown in FIG. 2 is for illustration only. Other embodiments of the process control system 100 could be used without departing from the scope of this disclosure. Also, other process control systems could be used to control a valve without departing from the scope of this disclosure.

In this example, one or more materials flow through a pipe 202, and the flow of material through the pipe 202 is controlled by a valve 204. The pipe 202 represents any suitable structure capable of transporting one or more materials. The pipe 202 could, for example, represent a steel or plastic pipe or tube capable of transporting oil, water, hydrochloric acid, or any other or additional material(s).

The valve 204 controls the rate at which the material or materials flow through the pipe 202. The valve 204 may, for example, change an opening in the pipe 202, where a larger valve opening allows more material to flow through the pipe 202. The valve 204 includes any structure capable of controlling the flow of one or more materials through a pipe 202.

A valve adjuster 206 controls the opening and closing of the valve 204. For example, the valve adjuster 206 may adjust the valve 204 to alter the opening in the pipe 202. In this way, the valve adjuster 206 may control the flow rate of material through the pipe 202. The valve adjuster 206 includes any structure capable of opening and/or closing a valve 204.

The valve adjuster 206 is controlled by the controller 104a based on information from the instrument 118. As shown in FIG. 2, the instrument 118 monitors or measures one or more characteristics associated with material flowing through the pipe 202. For example, the instrument 118 may measure the flow rate of material through the pipe 202. The instrument 118 could monitor or measure any other or additional characteristics of material flowing through the pipe 202. The instrument 118 outputs a process variable (PV) signal 208, which contains the various measurements made by the instrument 118.

The controller 104a uses the process variable signal 208 to generate an output (OP) signal 210. The output signal 210 controls the operation of the valve adjuster 206. For example, positive values in the output signal 210 could cause the valve adjuster 206 to open the valve 204 more, and negative values could cause the valve adjuster 206 to close the valve 204 more. As another example, smaller positive values in the output signal 210 could represent smaller openings of the valve 204, and larger positive values could represent larger openings of the valve 204.

In this example, the controller 104a uses a setpoint (SP) value 212 to control the valve 204. The setpoint value 212 identifies the desired value for the process variable signal 208. For example, the setpoint value 212 may represent the desired flow rate of material through the pipe 202, and the controller 104a may adjust the opening of the valve 204 so that the flow rate remains at or near a level indicated by the setpoint value 212. The controller 104a generates the output signal 210 using the model 120.

In this example embodiment, the controller 104a includes at least one processor 214 and at least one memory 216. The at least one memory 216 stores the model 120 and possibly historical operating data 122 associated with the controller 104a (although the historical operating data 122 could reside in any other location, or locations). The historical operating data 122 could, for example, represent samples of the process variable signal 208 and samples of the output signal 210. As described in more detail below, the historical operating data 122 may be used to validate the model 120.

Although FIG. 2 illustrates one example of a portion of a specific process control system 100, various changes may be made to FIG. 2. For example, the controller 104a could control the operation of any number of valves 204. Also, the valve 204 and the valve adjuster 206 could form a single integral unit. Further, while shown as residing internally to the controller 104a, the model 120 and the historical operating data 122 could reside in any suitable location or locations. In addition, the controller 104a in FIG. 2 is described as a single loop regulatory controller, meaning that the controller 104a handles one manipulated variable and one controlled variable. However, the model validation technique described in more detail below may be used with any suitable type of controller and is not limited to single loop regulatory controllers. As an example, the model validation technique could be used with multivariable model predictive controllers that control the setpoints used by multiple basic regulatory controllers. In particular embodiments, the multivariable model predictive controllers could be executed by or implemented within the servers 106a-106b of FIG. 1.

Figure 3:
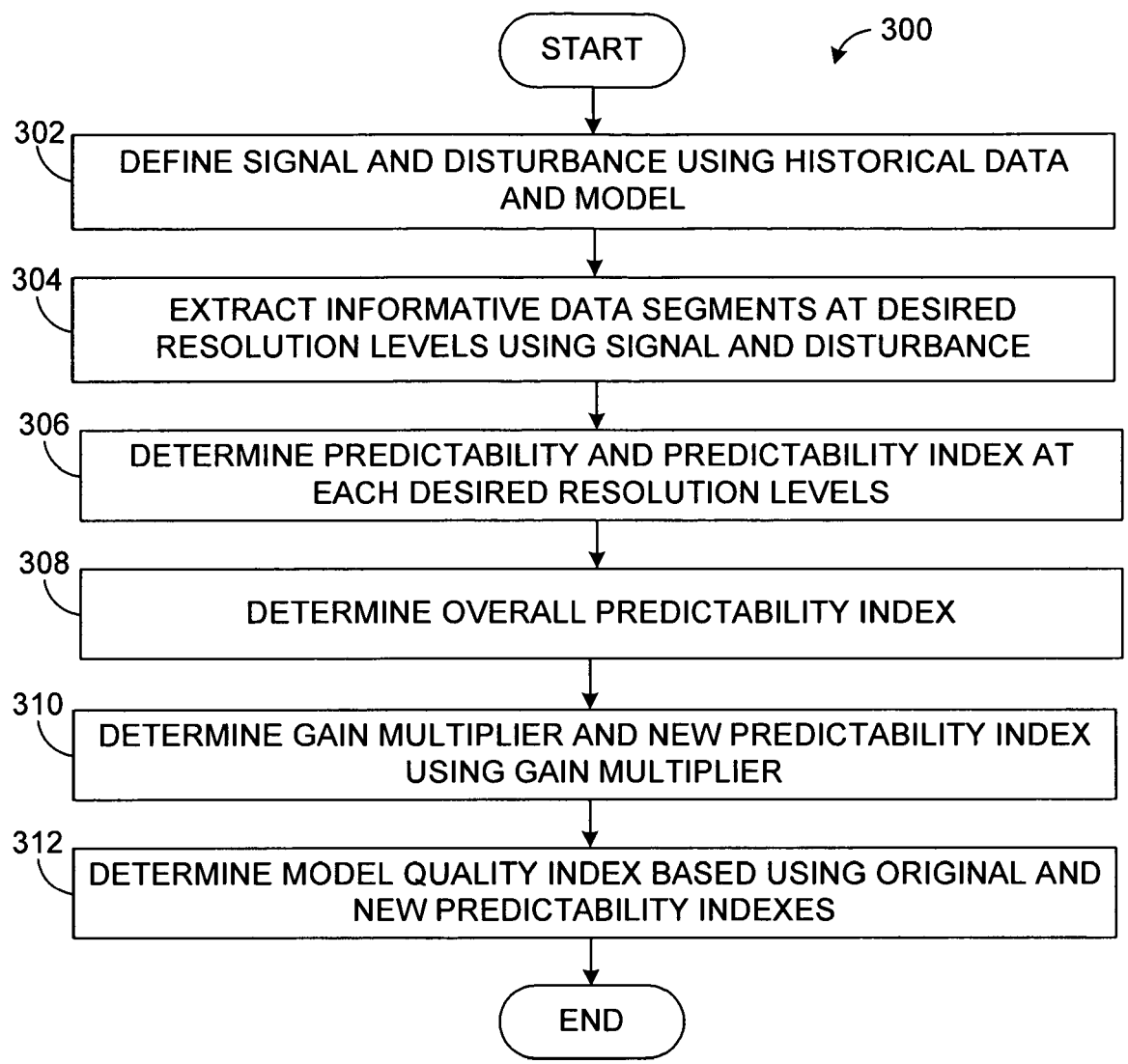
Figure 6:
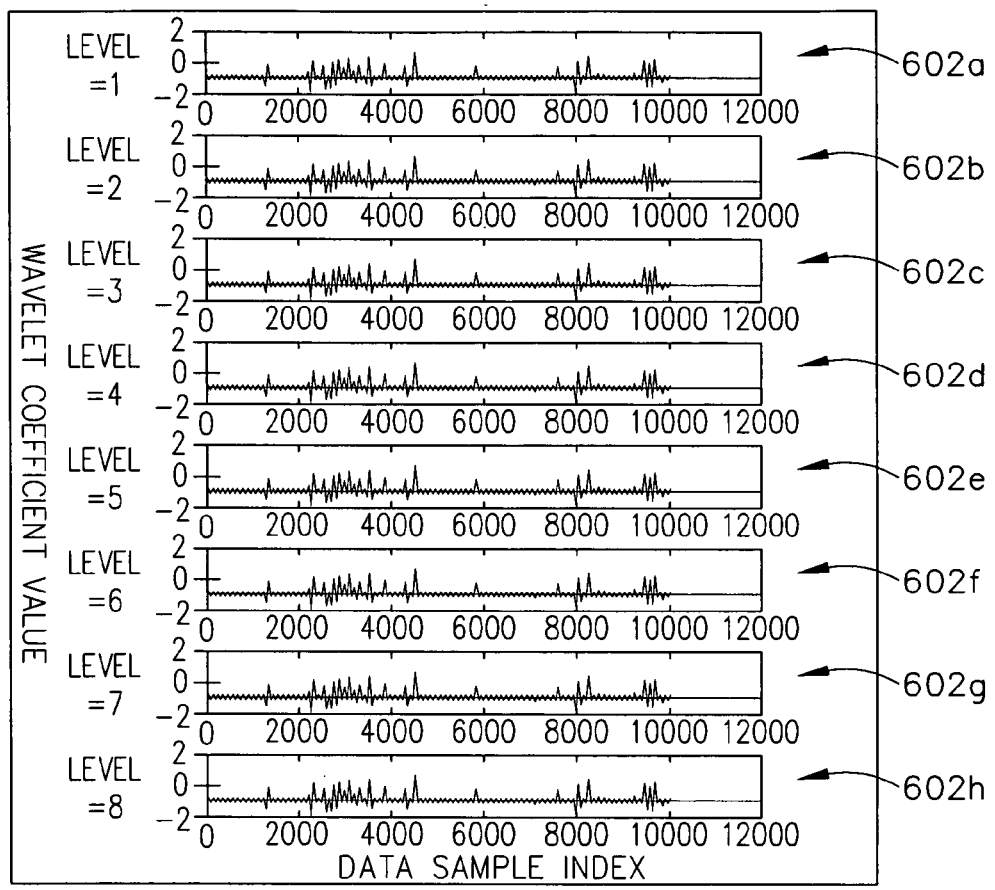

FIGS. 3 through 6 illustrate an example method for analyzing model quality in a process control system according to one embodiment of this disclosure. In particular, FIG. 3 illustrates an example method 300 for analyzing model quality, and FIGS. 4 through 6 illustrate examples of various steps contained in FIG. 3. For ease of explanation, FIGS. 3 through 6 are described with respect to validating the model 120 in the controller 104a within the process control system 100 of FIG. 1. The method 300 could be used for any other suitable device and in any other suitable system. Also, the validation of the model 120 could occur on any suitable component in the process control system 100, such as in the controller 104a, a server, or an operator station.

The historical operating data 122 of the controller 104a is used to analyze and validate the model 120 used by the controller 104a. In the following discussion, specific types of historical operating data 122 may be described. These types of historical operating data 122 include measured values of a controlled variable (denoted ym), a controlled variable lower limit value (denoted CV_lo), a controlled variable upper limit value (denoted CV_hi), and measured values of a manipulated variable (denoted u).

As shown in FIG. 3, the method 300 includes various steps. In some embodiments, the steps shown in FIG. 3 are performed for each submodel in the model 120 being validated. In this example, a signal (denoted s) and a disturbance (denoted d) are defined for each submodel using the historical operating data 122 and the model 120 at step 302. The signal s generally represents an output of a submodel, and the disturbance d generally represents a disruption of the submodel's output. As a particular example, the signal s and the disturbance d for each submodel may be determined as follows. For each submodel i, a prediction yp_sub(i) is determined using the following equation:

$$yp\_sub(i) = predict(submodel_i, u(i)) \quad (1)$$

where $submodel_i$ represents the particular mathematical function associated with submodel i, u(i) represents an input function defining inputs to the submodel i (which could represent collected historical values of the manipulated variable for that particular submodel), and predict represents a prediction function for a controlled variable using submodel i and function u(i). Using these results, the signal s and disturbance d for each submodel i are determined using the following equations:

$$s = yp\_sub(i) \quad (2)$$

$$d = \sum_{k=1, k \neq i}^{K} yp\_sub(k) \quad (3)$$

where K represents the total number of submodels in the model 120 for a particular controlled variable.

One specific example of the generation of a signal s and a disturbance d for multiple submodels is shown in FIGS. 4 and 5. In FIG. 4, three manipulated variables are used by three submodels 402-406 of a model 120 to control one controlled variable. FIG. 4 illustrates the transfer function G(s) and the step response of each of the three submodels 402-406. Using Equations (1)-(3) above, a signal s and a disturbance d are determined for each of the manipulated variables using the submodels 402-406 and some historical operating data. In this example, the historical operating data represents one week of historical data sampled at a rate of one sample per minute. As shown in FIG. 5, signals 502-506 represent the signal s for the three submodels 402-406, respectively. Signals 508-512 represent the disturbance d for the three submodels 402-406, respectively. These signals 502-512 may be further processed to analyze the quality of the model 120.

Returning to FIG. 3, after step 302, informative data segments are extracted at one or more desired resolution levels for each submodel using the signal s and disturbance d at step 304. As a particular example, the informative data segments may be extracted as follows. The signal s and the disturbance d for each submodel may be decomposed into multiple resolution levels, such as by using wavelet decomposition. One example of this is shown in FIG. 6, which illustrates the decomposition of signal 506 from FIG. 5 into eight resolution levels 602a-602h. The lower levels (such as levels 602a and 602b) typically focus on or reveal faster transients in the decomposed signal s 506. The higher levels (such as levels 602g and 602h) typically focus on or reveal slower transients in the decomposed signal. Once the signal s and disturbance d for a submodel are decomposed, the appropriate resolution level or levels for that submodel are selected. Informative or relevant data segments are then identified and extracted from the signal 506 using the selected resolution level(s) (the number of extracted data segments is denoted Q). Additional details of identifying and extracting data segments are shown in FIGS. 7 through 13, which are described below. In this document, the phrase "data segment" refers to a portion of a data signal.

After the informative data segments are extracted at step 304, predictabilities and predictability indexes are determined for the submodels using the extracted data segments at step 306. This may include, for example, determining a predictability for each extracted data segment. This may also include generating a predictability index for all extracted data segments at a desired resolution level.

As a particular example, the predictabilities and predictability indexes may be determined as follows. An overall prediction yp is determined for the controlled variable by summing the predictions yp_sub for all submodels using the following equation:

$$yp = \sum_{i=1}^{K} yp\_sub(i). \tag{4}$$

A prediction error for each extracted data segment pred_error_seg is calculated using the following equation:

$$pred\_error\_seg = ym\_seg - yp\_seg \tag{5}$$

where ym_seg represents measured values of an extracted data segment, and yp_seg represents the prediction yp for the same extracted data segment. The ym_seg and yp_seg for the data segment could be adjusted or shifted so that they are based on the same initial condition, meaning the values of the first element of ym_seg and the first element of yp_seg are the same.

The predictability of each data segment may be determined using any suitable technique. For example, the predictability of a data segment pred_seg could be determined using one or both of the two following equations:

$$pred\_seg = 1 - \frac{norm(pred\_error\_seg)}{norm(yp\_seg)}, \text{ or} \tag{6}$$

$$pred\_seg = 1 - \frac{norm(pred\_error\_seg)}{\max(norm(yp\_seg), norm(ym\_seg))} \tag{7}$$

where norm represents an operation to measure energy or size of a vector, and max represents a maximum operation. Different techniques could also be combined to determine the predictability of each data segment. For example, the correlation between the prediction error pred_error_seg and yp or u could be used, where a larger correlation results in a smaller predictability.

The predictability index for a desired resolution level is then determined as a weighted average of the predictabilities of the extracted data segments associated with that resolution level. For example, the predictability index for a desired resolution level pred_level could be determined using the following equation:

$$pred\_level = \left(\sum_{i=1}^{Q} w(i) * pred\_seg(i)\right) / \sum_{i=1}^{Q} w(i) \tag{8}$$

where w(i) represents a weight associated with the $i^{th}$ extracted data segment. The weight w of a data segment may be determined using the following equation:

$$w = norm(yp\_seg) * w\_seg \tag{9}$$

where w_seg represents a weight assigned to the data segment based on its classification. In particular embodiments, each extracted data segment may be classified into one of three categories, which are associated with different w_seg values. If the data segment was extracted because of a setpoint change in the controlled variable, the w_seg value for that data segment is set to four. If the data segment was extracted because controlled variable data was outside of the range defined by CV_hi and CV_lo, the w_seg value is set to two. Otherwise, the w_seg value is set to one. These values and classifications are for illustration only, and other w_seg values and classifications may be used.

After the predictabilities and predictability indexes are determined at step 306, an overall predictability index is determined for each submodel at step 308. This may include, for example, determining the overall predictability index for a submodel using the predictability indexes of the desired resolution levels for that submodel. As a particular example, the overall predictability index pred_overall may be determined using the predictability indexes of L desired resolution levels, such as by using the following equation:

$$pred\_overall = \left(\sum_{i=1}^{L} W\_level(i) * pred\_level(i)\right) / \sum_{i=1}^{L} W\_level(i) \tag{10}$$

where W_level(i) represents a weight associated with the $i^{th}$ resolution level. The weighting of the resolution levels may be determined in any suitable manner. For example, equal weighting could be used, where each resolution level has a W_level value of one. As another example, the weighting for a resolution level may be proportional to the total length of the data segments extracted using that resolution level, where longer lengths are associated with larger weights. As a third example, the weighting may be based on the resolution levels themselves, such as when higher levels have larger weights to emphasize lower frequencies.

A gain multiplier and a new predictability index are generated for each submodel at multiple resolution levels at step 310. The gain multiplier may be determined in any suitable manner. As a particular example, assume that yp_seg(j, i) represents the adjusted prediction for data segment j in submodel i at a particular resolution level. Also, assume ym_seg(j) represents the adjusted measurements of the controlled variable in data segment j. In addition, assume GM_level(i) represents a gain multiplier for submodel i at a particular resolution level. The gain multipliers GM_level(i) may be determined using both of the following methods:

$$\begin{bmatrix} yp\_seg(1,1) & yp\_seg(1,2) & \ldots & yp\_seg(1,K) \\ yp\_seg(2,1) & yp\_seg(2,2) & \ldots & yp\_seg(2,K) \\ \vdots & \vdots & \ddots & \vdots \\ yp\_seg(Q,1) & yp\_seg(Q,2) & \ldots & yp\_seg(Q,K) \end{bmatrix} \quad (11)$$

$$\begin{bmatrix} GM\_level(1) \\ GM\_level(2) \\ \vdots \\ GM\_level(K) \end{bmatrix} = \begin{bmatrix} ym\_seg(1) \\ ym\_seg(2) \\ \vdots \\ ym\_seg(Q) \end{bmatrix}$$

and $$\begin{bmatrix} yp\_seg(1,i) \\ yp\_seg(2,i) \\ \vdots \\ yp\_seg(Q,i) \end{bmatrix} \cdot GM\_level(i) = \begin{bmatrix} ym\_seg(1) - \sum_{k=1,k\neq i}^{K} yp\_seg(1,k) \\ ym\_seg(2) - \sum_{k=1,k\neq i}^{K} yp\_seg(2,k) \\ \vdots \\ ym\_seg(Q) - \sum_{k=1,k\neq i}^{K} yp\_seg(Q,k) \end{bmatrix} \quad (12)$$

The final gain multiplier GM_level(i) for a submodel at the particular resolution level may represent the average of the gain multipliers determined using equations (11) and (12).

An overall gain multiplier GM_overall(i) can be calculated from the gain multipliers GM_level(i) at the multiple resolution levels. For example, the overall gain multiplier GM_overall(i) can be calculated as the mean of the gain multipliers GM_level(i) at multiple resolution levels.

A new prediction yp_new for submodel i is then determined using the gain multiplier GM_overall(i) for that submodel as shown in the following equation:

$$yp\_new = yp\_sub(i) * GM\_overall(i) + \sum_{k=1,k\neq i}^{K} yp\_sub(k). \quad (13)$$

Various equations shown above may then be used again with the new predictability index yp_new to determine a new predictability at multiple resolution levels and a new overall predictability index pred_overall_new for the submodel.

A quality index for each submodel in the model 120 is determined using the old and new overall predictability indexes for that submodel at step 312. A quality index identifies the quality of a submodel being used to control one or more process elements. The quality index for a submodel may be a function of the old overall predictability index pred_overall and the new overall predictability index pred_overall_new. The function can represent any suitable linear or non-linear function for associating the quality index and the old and new overall predictability indexes. For example, the function could provide better quality indexes as the value of pred_overall increases. Also, the function could provide worse quality indexes as the difference between pred_overall and pred_overall_new increases.

At this point, the quality indexes could be used in any suitable manner. For example, the quality index for a submodel could be compared to a threshold to determine if the submodel has an acceptable quality. If not, the submodel could be adjusted or replaced in the process control system 100.

Although FIGS. 3 through 6 illustrate one example of a method for analyzing model quality in a process control system, various changes may be made to FIGS. 3 through 6. For example, the analysis of the model 120 has been described as occurring on a submodel-by-submodel basis. In other embodiments, a model quality index could be determined for a group of submodels. This may be useful, for example, when two or more manipulated variables move is a correlated pattern. In these embodiments, a signal s processed in step 304 may represent the sum of the predictions for the group of submodels, and the disturbance d processed in step 304 may represent the sum of the predictions for the rest of the group of submodels. A single model quality index could then be generated for the entire group of submodels.

As another example, the quality analysis could be performed using informative data segments extracted for a particular group of submodels. Signals s1, s2, . . . , si may be defined as the prediction from each submodel in the group, and the signal s processed in step 304 may represent the sum of signals s1, s2, . . . , si. The disturbance d processed in step 304 may represent the sum of the predictions for the submodels not contained in the group. The informative data segments may then be extracted from the signal s and the disturbance d, and the predictabilities of all submodels in the group are determined using the same extracted data segments. In this example, the predictabilities determined at step 306 could be based on a function that measures a correlation between an error residue (a difference between measured values and predicted values) and each of the signals s1, s2, . . . , si.

As yet another example, the quality analysis of the model 120 could take into account unmeasured disturbance variables. Some characteristics of an unmeasured disturbance variable could be known, such as by measurements of a controlled variable or by general engineering knowledge of a processing facility. As a particular example, experience could show that an unmeasured disturbance variable has a large energy effect at lower frequencies. Because of this, higher resolution levels could be weighted less than lower resolution levels, thereby reducing the effects of the unmeasured disturbance variable.

Figure 7:
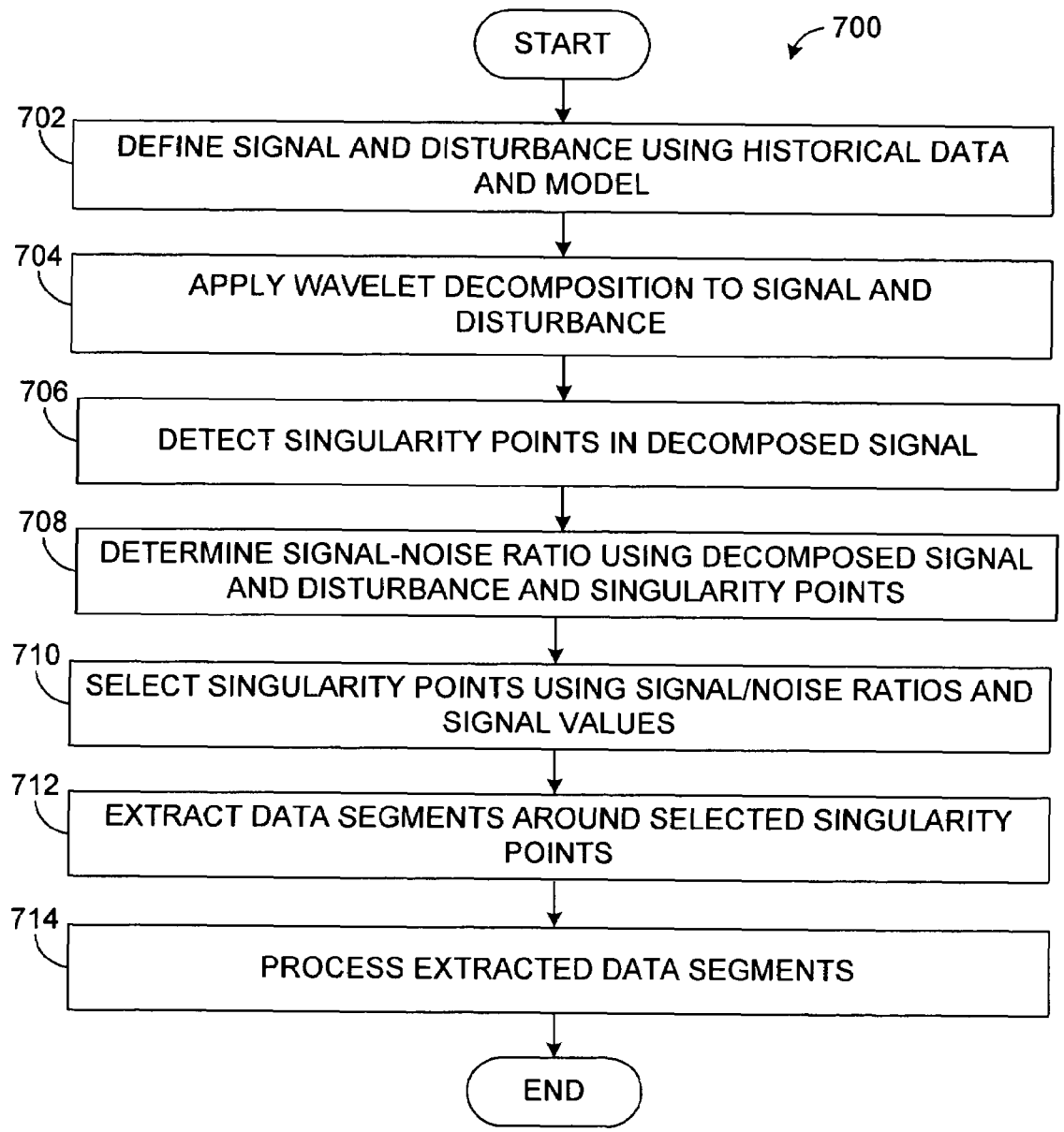

FIGS. 7 through 13 illustrate an example method for identifying informative data for use in analyzing model quality in a process control system according to one embodiment of this disclosure. In particular, FIG. 7 illustrates an example method 700 for identifying informative data, and FIGS. 8 through 13 illustrate examples of various steps contained in FIG. 7. For ease of explanation, FIGS. 7 through 13 are described with respect to identifying informative data for use in validating the model 120 in the controller 104a within the process control system 100 of FIG. 1. The method 700 could be used for any other suitable device and in any other suitable system, whether or not the identified informative data is used to validate a model. Also, the identification of informative data could occur on any suitable component in the process control system 100, such as in the controller 104a, a server, or an operator station.

As noted above, it is often difficult to identify relevant data from a large amount of historical operating data 122 generated by a controller. In general, identifying transients in a signal represents one technique for selecting more relevant portions of that signal. FIGS. 7 through 13 illustrate a technique for identifying informative data based on identifying transients that occur where large signal excitations and large signal-to-noise ratios (SNRs) exist. Since different transients could have different frequencies, this technique also involves decomposing signals into multiple resolution levels, thereby allowing identification of transients at both higher frequencies (lower resolution levels) and lower frequencies (higher resolution levels).

Figure 8:
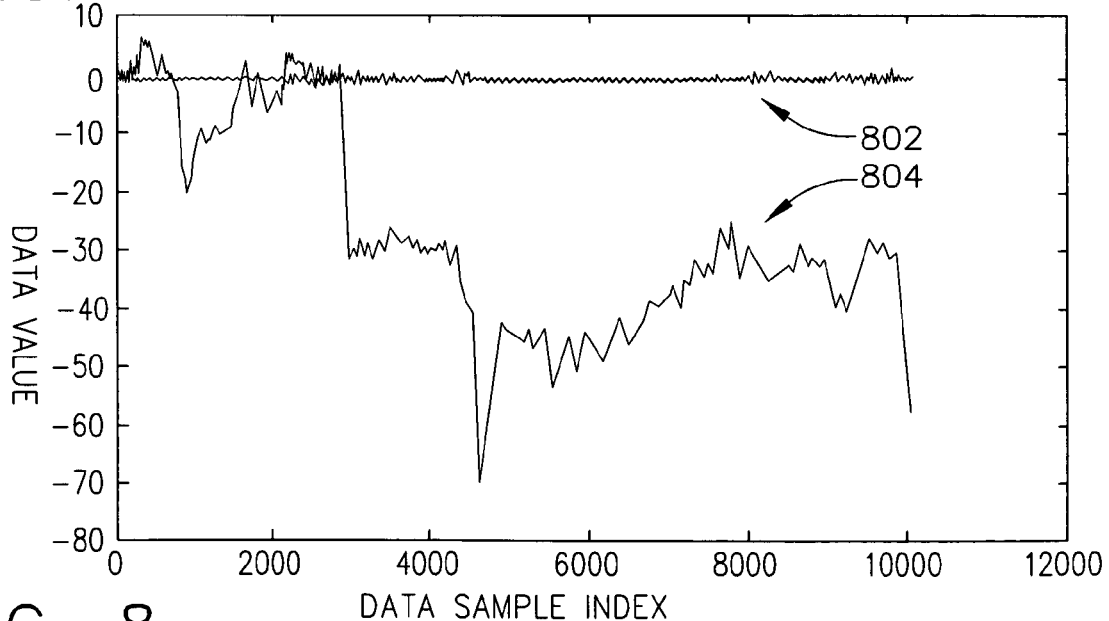
FIGS. 7 through 13 illustrate an example method for identifying informative data for use in analyzing model quality in a process control system according to one embodiment of this disclosure.

As shown in FIG. 7, a signal s and a disturbance d are defined at step 702. This may include, for example, the same or similar process described above with respect to step 302 of FIG. 3. The definitions of signal s and disturbance d are often application-dependent. The proposed use of the data to be extracted using the signal s and the disturbance d may control how the signal s and the disturbance d are defined or calculated. In general, the signal s may be defined as a variable where large energy levels are desired, while the disturbance d may be defined as a variable where small energy levels are desired. FIG. 8 illustrates one example of signals 802-804, which represent the signal s and the disturbance d, respectively, that could be generated at step 702. In this example, the signals 802-804 represent the same signals 506 and 512 previously described with respect to FIG. 5.

Figure 9:
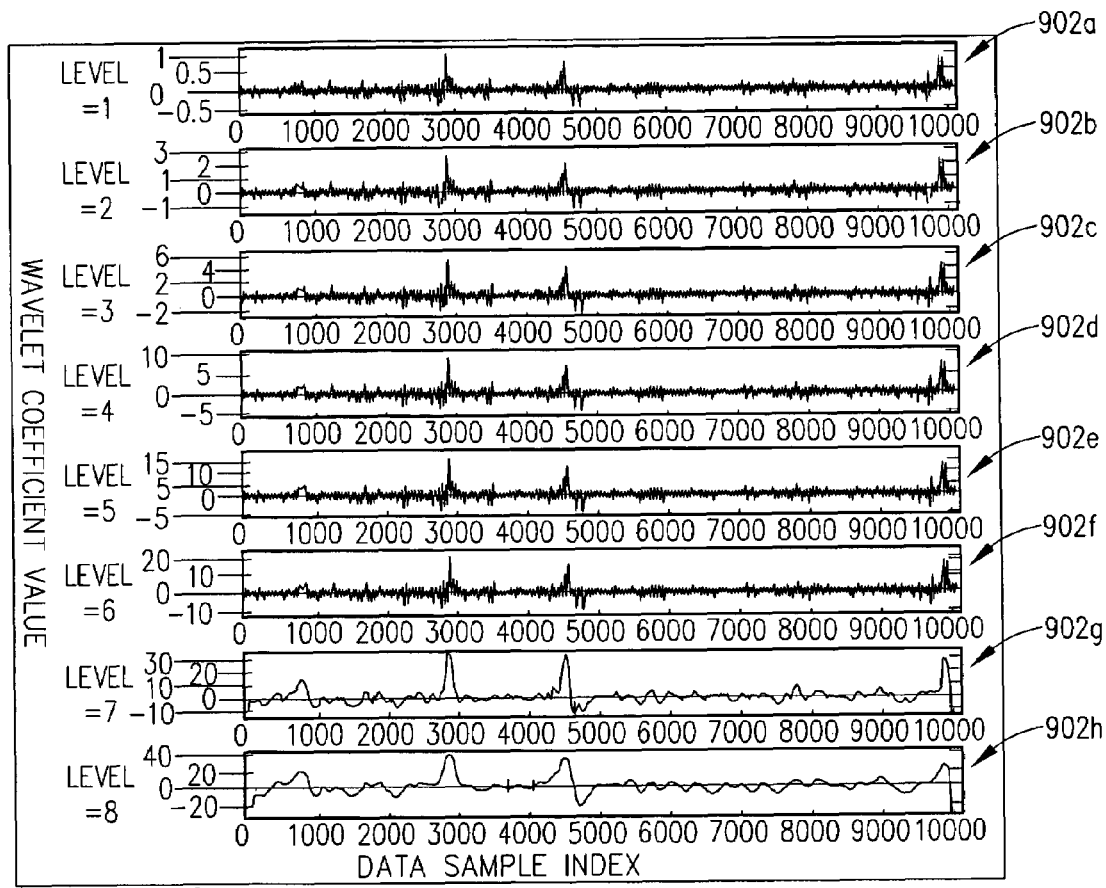

Redundant wavelet decomposition is applied to the signal s and the disturbance d at step 704. This may include, for example, applying a discrete dyadic wavelet transform (DDWT) or other redundant wavelet transform to the signal s and the disturbance d. The results of the wavelet transform of the signal s are denoted Ws, and the results of the wavelet transform of the disturbance d are denoted Wd. FIG. 9 illustrates one example decomposition of the signals 802-804 into multiple resolution levels 902a-902h. Based on the signals 802-804 shown in FIG. 8, the wavelet coefficients corresponding to the disturbance d have larger amplitudes than the wavelet coefficients corresponding to the signal s at the higher resolution levels.

Figure 10:
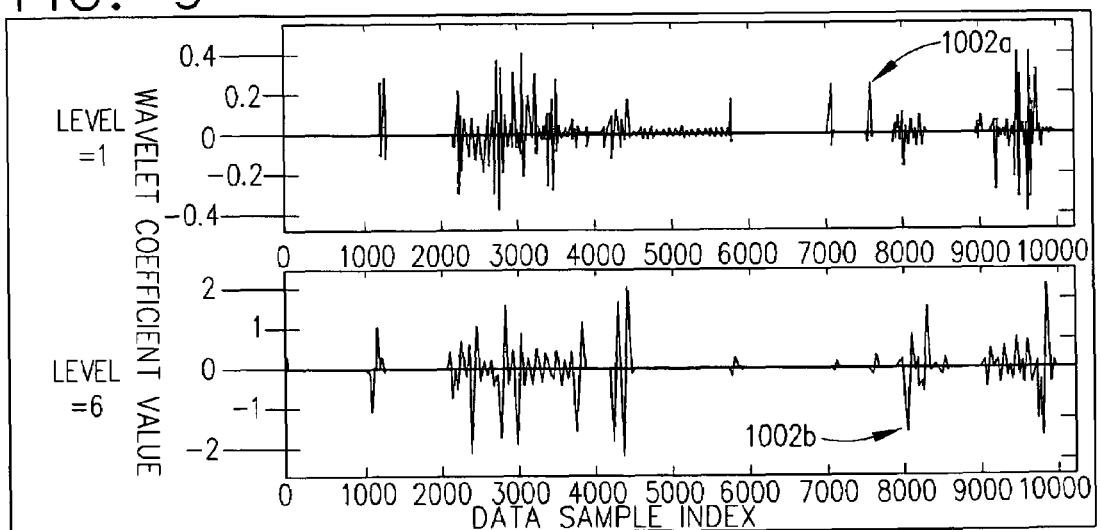

Singularity points are detected in the decomposed signal s (the Ws wavelet coefficients) at step 706. This may include, for example, identifying local maximum and local minimum values in the wavelet coefficients Ws at each resolution level. Thresholds could be used to reduce the number of singularity points detected. For example, the singularity points could represent local maximum and local minimum values having an absolute value that exceeds a threshold value. As a particular example, the singularity points could represent local maximum and local minimum values having an absolute value that exceeds twenty percent of the maximum absolute wavelet coefficient value. FIG. 10 illustrates one example of the detection of singularity points 1002a and 1002b in different resolution levels. In this example, the singularity points 1002a represent local maximum and local minimum values found using this threshold in resolution level 902a, and singularity points 1002b represent local maximum and local minimum values found using this threshold in resolution level 902f.

A signal-noise ratio is determined for each resolution level using the decomposed signal s and disturbance d and the singularity points at step 708. In general, each of the resolution levels 902a-902h may have a different number of singularity points in different positions. A transient signal-to-noise value SNR for a particular singularity point sp in a particular resolution level may be determined using the following equation:

$$SNR = abs(Ws_{sp})/abs(Wd_{sp}) \quad (14)$$

where $Ws_{sp}$ represents the wavelet coefficient of decomposed signal s at singularity point sp, and $Wd_{sp}$ represents the wavelet coefficient of decomposed disturbance d at singularity point sp.

In other embodiments, the transient SNR value for a particular singularity point sp in a particular resolution level may be determined using the following equation:

$$SNR = \text{norm}(Ws_{sp}(\text{region}))/\text{norm}(Wd_{sp}(\text{region})) \quad (15)$$

where $Ws_{sp}(\text{region})$ represents a region (multiple wavelet coefficients of decomposed signal s) around the singularity point sp, and $Wd_{sp}$ represents a region (multiple wavelet coefficients of decomposed disturbance d) around the singularity point sp. In particular embodiments, the region around a singularity point sp may be variable. For example, the region could be defined based on the resolution level being analyzed. As a particular example, the region around singularity point sp could be defined as [sp−6*level, sp+6*level], where level represents the number of the resolution level being analyzed. In this way, smaller regions are used at lower resolution levels, and larger regions are used at higher resolution levels.

In yet other embodiments, noise-to-signal ratios (NSR) are calculated since the value of the wavelet coefficient Ws at a local maximum or minimum is not zero. In these embodiments, one or multiple NSR values may be determined using the following equations:

$$NSR_1 = abs(Wd_{sp})/abs(Ws_{sp}) \quad (16)$$

$$NSR_2 = \text{norm}(Wd_{sp}(\text{region}))/\text{norm}(Ws_{sp}(\text{region})) \quad (17)$$

In this document, the phrase "signal-noise ratio" refers to any ratio involving signal and noise, whether expressed as SNR or NSR.

Figure 11:
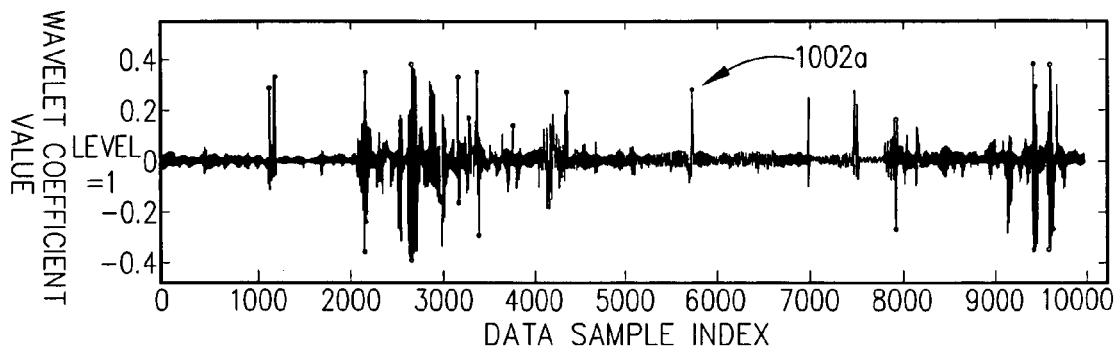

Various ones of the identified singularity points are selected for further processing at step 710. This may include, for example, selecting the singularity points having high signal-to-noise ratios (or low noise-to-signal ratios) and high signal values. As a particular example, singularity points where $NSR_1 < 0.3$ and $NSR_2 < 0.3$ could be selected. Moreover, an excessive number of singularity points could slow the processing performed during the method 700. If an excessive number of singularity points with high SNR (or low NSR) is identified, the singularity points with the highest absolute wavelet values could be selected for further processing (such as the forty singularity points with the largest absolute wavelet values). As shown in FIG. 11, only some of the singularity points 1002a from FIG. 10 satisfy these conditions, and none of the singularity points 1002b from FIG. 10 satisfies these conditions. This indicates that the disturbance d (signal 804) dominates the signal s (signal 802) energy-wise at the higher resolution levels (lower frequency levels).

Figure 12:
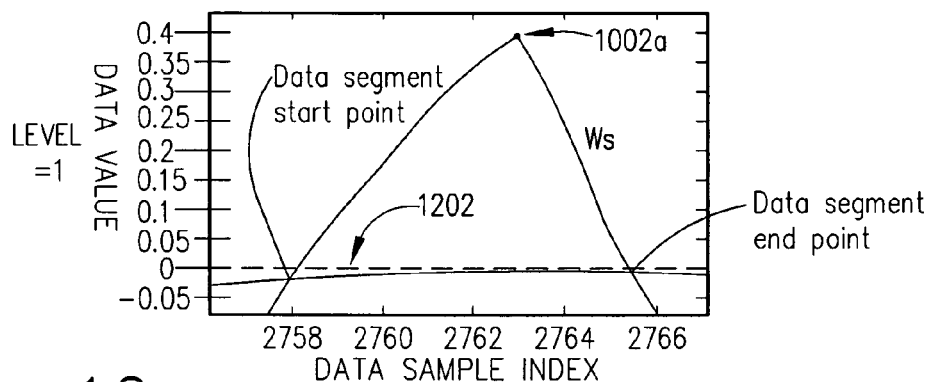

Data segments around the selected singularity points are extracted from the various resolution levels at step 712. The data segments could be extracted using any suitable technique. For example, as shown in FIG. 12, an extracted data segment could represent a data segment defined by starting and ending points on either side of a singularity point 1002a. The starting and ending points represent locations where the wavelet coefficients Ws cross a threshold value 1202. In the example shown in FIG. 12, the threshold value 1202 represents a value of zero, although any other suitable value could be used. The threshold value 1202 could be fixed and uniform for all resolution levels, or the threshold value 1202 could be adjustable. An adjustable threshold value 1202 could be calculated, for example, as a percentage of the local maximum or local minimum value. While the starting and ending points are identified in the wavelet domain, the extracted data segment itself resides in the original signal domain.

Figure 13:
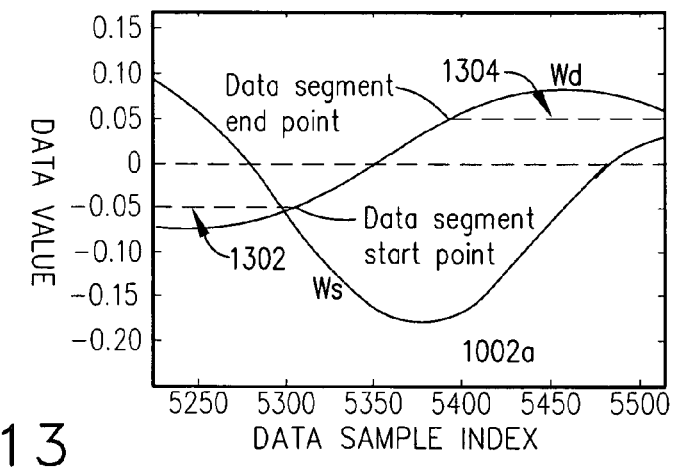

As another example, as shown in FIG. 13, an extracted data segment could again represent a data segment defined by starting and ending points on either side of a singularity point 1002a. In this example, the starting and ending points represent locations where the wavelet coefficients Wd cross threshold values 1302-1304. In the example shown in FIG. 13, the threshold values 1302-1304 represent values of ±0.05, although any other suitable value(s) could be used. Again, the threshold values 1302-1304 could be fixed and uniform for all resolution levels, or the threshold values 1302-1304 could be adjustable. Adjustable threshold values 1302-1304 could be calculated, for example, as a percentage of the local maximum or local minimum value. Again, while the starting and ending points are identified in the wavelet domain, the extracted data segment itself resides in the original signal domain.

FIGS. 12 and 13 illustrate two possible techniques for extracting data segments around singularity points. However, any other suitable technique could be used. For example, any technique that extract data segments having high SNR (or low NSR) and high signal energy could be used. Also, multiple techniques could be combined to make the data segment extraction more conservative (by requiring data segments to satisfy all conditions for all techniques) or more aggressive (by requiring data segments to satisfy conditions for only one technique).

In addition, in particular embodiments, the starting and ending points could be adjusted in any suitable manner. For example, the starting point of a data segment could be adjusted based on whether the wavelet coefficients Ws are trending upward or downward. If the wavelet coefficients Ws are trending upward near a singularity point, the starting point may be adjusted to represent the minimum wavelet coefficient Ws between the original starting point and the singularity point. If the wavelet coefficients Ws are trending downward near a singularity point, the starting point may be adjusted to represent the maximum wavelet coefficient Ws between the original starting point and the singularity point.

Based on the signals 802-804 of FIG. 8, the above techniques could be used to extract data segments from resolution levels 902a-902c. No data segments may be extracted from resolution levels 902d-902h. This indicates that the extracted data segments have a relatively high frequency. This is typically not observable or determinable by simply examining the signal s (signal 802) and disturbance d (signal 804).

The extracted data segments are then processed further at step 714. This may include, for example, using the extracted data segments to validate a model 120. This may also include using the extracted data segments in any other suitable manner.

Although FIGS. 7 through 13 illustrate one example of a method for identifying informative data, various changes may be made to FIGS. 7 through 13. For example, multiple disturbances d could be used, and SNR or NSR values could be determined for each signal-disturbance pair. An overall SNR or NSR value determined at step 708 could be defined as a function of the SNR values or the NSR values for all disturbances d. Also, singularity points could represent points that satisfy the function of all of the SNR or NSR values selected at step 710.

As another example, the identification of informative data could take into account unmeasured disturbance variables. A threshold value could be determined for an unmeasured disturbance variable, and the singularity points identified at step 706 could have a much larger magnitude than the unmeasured disturbance variable threshold.

As yet other examples, multiple signals s could be defined, and data segments may be extracted based on the SNR or NSR values for all signal-disturbance pairs. Also, when comparing wavelet coefficients of a signal s and a disturbance d, the coefficients could reside in different resolution levels (such as adjacent resolution levels). In addition, wavelet coefficients at multiple levels could be used to calculate a SNR or NSR value.

It may be advantageous to set forth definitions of certain words and phrases used throughout this patent document. The term "couple" and its derivatives refer to any direct or indirect communication between two or more elements, whether or not those elements are in physical contact with one another. The term "application" refers to one or more computer programs, sets of instructions, procedures, functions, objects, classes, instances, or related data adapted for implementation in a suitable computer language. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
   identifying a signal and a disturbance using historical data associated with one or more process variables;
   decomposing the signal and the disturbance at a plurality of resolution levels;
   identifying a plurality of points associated with the decomposed signal using the decomposed signal and the decomposed disturbance;
   selecting at least some of the points; and
   extracting a plurality of data segments from the signal and storing the data segments, the data segments associated with the selected points.

2. The method of claim 1, wherein the plurality of points comprises local maximum and local minimum values in the decomposed signal at one or more of the resolution levels.

3. The method of claim 1, wherein selecting at least some of the points comprises:
   determining at least one of a signal-to-noise ratio and a noise-to-signal ratio for each point using the decomposed signal and the decomposed disturbance.

4. The method of claim 3, wherein selecting at least some of the points further comprises:
   selecting each point where at least one of the signal-to-noise ratio is above a first threshold and the noise-to-signal ratio is below a second threshold.

5. The method of claim 1, wherein extracting the plurality of data segments comprises:
extracting each data segment between a starting location and an ending location, the starting and ending locations determined using at least one of the decomposed signal and the decomposed disturbance.

6. The method of claim 5, further comprising determining the starting and ending locations based on where the decomposed signal crosses a threshold value.

7. The method of claim 5, further comprising determining the starting and ending locations based on where the decomposed disturbance crosses one or more threshold values.

8. The method of claim 1, wherein decomposing the signal and the disturbance comprises decomposing the signal and the disturbance using wavelet decomposition.

9. The method of claim 1, wherein the historical data associated with the one or more process variables comprises at least one of:
one or more measurements associated with one or more controlled variables; and
one or more measurements associated with one or more manipulated variables, the one or more manipulated variables used to control the one or more controlled variables via a model.

10. The method of claim 1, wherein decomposing the signal and the disturbance comprises decomposing the signal at the plurality of resolution levels and separately decomposing the disturbance at the plurality of resolution levels.

11. An apparatus, comprising:
at least one memory storing historical data associated with one or more process variables; and
at least one processor:
identifying a signal and a disturbance using the historical data;
decomposing the signal and the disturbance at a plurality of resolution levels;
identifying a plurality of points associated with the decomposed signal using the decomposed signal and the decomposed disturbance;
selecting at least some of the points; and
extracting a plurality of data segments from the signal and storing the data segments, the data segments associated with the selected points.

12. The apparatus of claim 11, wherein the plurality of points comprises local maximum and local minimum values in the decomposed signal at one or more of the resolution levels.

13. The apparatus of claim 11, wherein the at least one processor is capable of selecting at least some of the points by:
determining at least one of a signal-to-noise ratio and a noise-to-signal ratio for each point using the decomposed signal and the decomposed disturbance; and
selecting each point where at least one of: the signal-to-noise ratio is above a first threshold and the noise-to-signal ratio is below a second threshold.

14. The apparatus of claim 11, wherein the at least one processor is capable of extracting the plurality of data segments by:
extracting each data segment between a starting location and an ending location, the starting and ending locations determined using at least one of the decomposed signal and the decomposed disturbance.

15. The apparatus of claim 14, wherein the at least one processor is capable of determining the starting and ending locations based on at least one of:
where the decomposed signal crosses a threshold value; and
where the decomposed disturbance crosses one or more threshold values.

16. The apparatus of claim 11, wherein the historical data associated with the one or more process variables comprises at least one of:
one or more measurements associated with one or more controlled variables; and
one or more measurements associated with one or more manipulated variables, the one or more manipulated variables used to control the one or more controlled variables via a model.

17. The apparatus of claim 16, wherein the at least one processor is further capable of processing the extracted data segments to validate the model.

18. A computer program embodied on a computer readable medium and operable to be executed by a processor, the computer program comprising computer readable program code for:
identifying a signal and a disturbance using historical data associated with one or more process variables;
decomposing the signal and the disturbance at a plurality of resolution levels;
identifying a plurality of points associated with the decomposed signal using the decomposed signal and the decomposed disturbance;
selecting at least some of the points; and
extracting a plurality of data segments from the signal and storing the data segments, the data segments associated with the selected points.

19. The computer program of claim 18, wherein the computer readable program code for selecting at least some of the points comprises computer readable program code for:
determining at least one of a signal-to-noise ratio and a noise-to-signal ratio for each point using the decomposed signal and the decomposed disturbance; and
selecting each point where at least one of: the signal-to-noise ratio is above a first threshold and the noise-to-signal ratio is below a second threshold.

20. The computer program of claim 18, wherein the computer readable program code for extracting the plurality of data segments comprises computer readable program code for:
extracting each data segment between a starting location and an ending location, the starting and ending locations determined using at least one of the decomposed signal and the decomposed disturbance.

21. The computer program of claim 20, further comprising computer readable program code for determining the starting and ending locations based on at least one of:
where the decomposed signal crosses a threshold value; and
where the decomposed disturbance crosses one or more threshold values.

* * * * *